(12) United States Patent
Lafleur et al.

(10) Patent No.: US 7,177,635 B2
(45) Date of Patent: Feb. 13, 2007

(54) SENSOR-BASED AUGMENTATION OF BLOCKAGE RECOVERY

(75) Inventors: Phil Lafleur, Ontario (CA); Wayne McPherson, Ontario (CA); Sean Faulkner, Ontario (CA); David J. Roscoe, Ontario (CA)

(73) Assignee: TransCore Link Logistics Corporation, Ontario (CA)

( * ) Notice: Subject to any disclaimer, the term of this patent is extended or adjusted under 35 U.S.C. 154(b) by 0 days.

(21) Appl. No.: 11/082,850

(22) Filed: Mar. 18, 2005

(65) Prior Publication Data

US 2005/0208896 A1  Sep. 22, 2005

Related U.S. Application Data

(63) Continuation-in-part of application No. 10/998,609, filed on Nov. 30, 2004, now abandoned.

(60) Provisional application No. 60/554,418, filed on Mar. 19, 2004.

(51) Int. Cl.
*H04M 11/00* (2006.01)
*H04Q 7/20* (2006.01)

(52) U.S. Cl. .................................... 455/421; 455/574
(58) Field of Classification Search ............... 455/421, 455/574, 67.11, 67.13, 67.7, 556.1, 557; 340/540, 541, 686.1, 441, 445
See application file for complete search history.

(56) References Cited

U.S. PATENT DOCUMENTS

| 5,953,677 | A | 9/1999 | Sato |
| 6,163,690 | A | 12/2000 | Lilja |
| 6,219,540 | B1 | 4/2001 | Besharat et al. |
| 6,803,854 | B1 | 10/2004 | Adams et al. |
| 6,813,560 | B2 | 11/2004 | Van Diggelen et al. |
| 2004/0203699 | A1 | 10/2004 | Oesterling et al. |

*Primary Examiner*—Matthew Anderson
*Assistant Examiner*—Lewis West
(74) *Attorney, Agent, or Firm*—Blank Rome LLP

(57) ABSTRACT

A method for improving long-term blockage recovery of a communications signal is disclosed. The method includes monitoring a blockage source using at least one application specific-sensor. Time spent in the blockage source is ascertained. Information obtained from the application-specific sensor may be combined with the ascertained time spent in the blockage source to predict a likely blockage recovery time interval.

18 Claims, 2 Drawing Sheets

SENSOR-BASED AUGMENTATION OF BLOCKAGE RECOVERY

REFERENCE TO RELATED APPLICATIONS

The present application claims the benefit of U.S. Provisional Patent Application No. 60/554,418, filed Mar. 19, 2004, and is also a continuation-in-part of U.S. patent application Ser. No. 10/998,609, filed Nov. 30, 2004 now abandoned, currently pending. The disclosures of both of those applications are hereby incorporated by reference in their entireties into the present application.

FIELD OF THE INVENTION

The present invention is generally related to mobile communications systems and, more particularly, is related to a method for improving long-term blockage recovery of a communication signal.

BACKGROUND OF THE INVENTION

All mobile communication systems suffer from short-term and long-term blockage. In particular, communication systems requiring line of sight are frequently blocked. An example of short-term blockage is a tunnel. An example of a long-term blockage source is a parking garage. Blockage occurs when the loss introduced by the blockage source exceeds the link margin in the communications system. Depending on the design constraints, a variety of schemes may be used to reestablish the communications link once the blockage source is removed.

One approach is to continually monitor the communications channel, and reestablish communications as soon as the blockage source is removed. That is suitable for short-term blockage and the long-term blockage when power consumption is not important. In many mobile communications applications, however, power consumption is critical. With battery powered devices, long-term blockage could result in permanent blockage if the battery is drained due to a power hungry blockage recovery scheme.

Another approach, intended to overcome that difficulty, is called periodic monitoring. The power consumption constraint in battery-powered applications leads to less frequent monitoring of the channel. That reduces power consumption, and also increases the amount of time required to reestablish communications once the blockage source is removed. Thus, a periodic monitoring approach is not preferred.

In yet another approach, optimized periodic monitoring, one attempts to optimize the monitoring interval based on the amount of time the mobile device has been blocked. That involves monitoring the channel more frequently at first, in the hope that the blockage is only short-term, which is typically more frequent than long-term blockage. That minimizes the amount of time required to reestablish communications once the blockage source is removed for the most frequently encountered scenario. If the device has been blocked for a longer period of time, it reduces the frequency of channel monitoring in an effort to conserve power.

The aforementioned approaches can become quite sophisticated, and can make use of several possible sampling intervals in an effort to optimize the trade-off between power consumption and latency. Those schemes are often based on statistical data specific to the target application, such as long-haul trucking, for example. Having representative statistics allows the designer to optimize the blockage recovery scheme.

Despite the best efforts of the designer, there are some applications where power consumption and latency requirements are outside of the performance envelope that can be achieved using the mentioned blockage recovery schemes. Applications that have very long-term blockage, require low latency, and require low power consumption can be very challenging.

An example of such an application is container shipping. In container shipping, containers are stacked on the ship, resulting in blockage for the duration of the trip. When the ship is unloaded, the containers are often stacked once again in the shipping yard. That leaves a short interval during unloading in which to establish communications and send a report.

SUMMARY OF THE INVENTION

Thus, an unaddressed need exists in the art to address the aforementioned deficiencies and inadequacies associated with improving long-term blockage recovery of a communications signal.

It is therefore an object of the present invention to provide a method for improving long-term blockage recovery of a communications signal.

It is another object of the present invention to reduce power consumption when in long-term blockage.

It is still another object of the present invention to reduce latency when a monitored application is coming out of long-term blockage.

Briefly described, a preferred embodiment of the system, among others, can be implemented as follows. The preferred embodiment improves long-term blockage recovery through the use of application-specific sensors. That differs from blockage recovery techniques described above, in that the long-term blockage scheme goes beyond looking at the time spent in blockage to determine its reaction.

Sensors monitor the most likely blockage sources and/or detect when they are likely to be removed. For example, in container shipping, a proximity sensor could provide information on when the container above the source of blockage had been removed. In a case where a vehicle is parked in a parking garage, an accelerometer or ignition sensor could detect when the vehicle began to move or when the engine was started. In the time following movement or ignition, there is a higher likelihood that the blockage source will be removed. That information could then be used along with information on the time spent in blockage to provide improved recovery from long-term blockage without sacrificing power consumption. Hence, the actual source of the blockage most likely to impact the communications channel for a specific application is measured.

Because monitoring the sensors consumes much less power than monitoring the communications channel, it can be monitored more frequently, possibly continuously, and still ensure low power consumption. That increased monitoring improves the latency because the device knows when it is most likely to come out of long-term blockage.

Other systems, methods, features and advantages of the present invention will be or become apparent to one with skill in the art upon examination of the following drawing and detailed description. It is intended that all such additional systems, methods, features and advantages be included within this description, be within the scope of the present invention, and be protected by the accompanying claims.

BRIEF DESCRIPTION OF THE DRAWING

Many aspects of the invention can be better understood with reference to the following drawings. The components in the illustrate the principles of the present invention.

DETAILED DESCRIPTION OF THE PREFERRED EMBODIMENT

Figure 1:
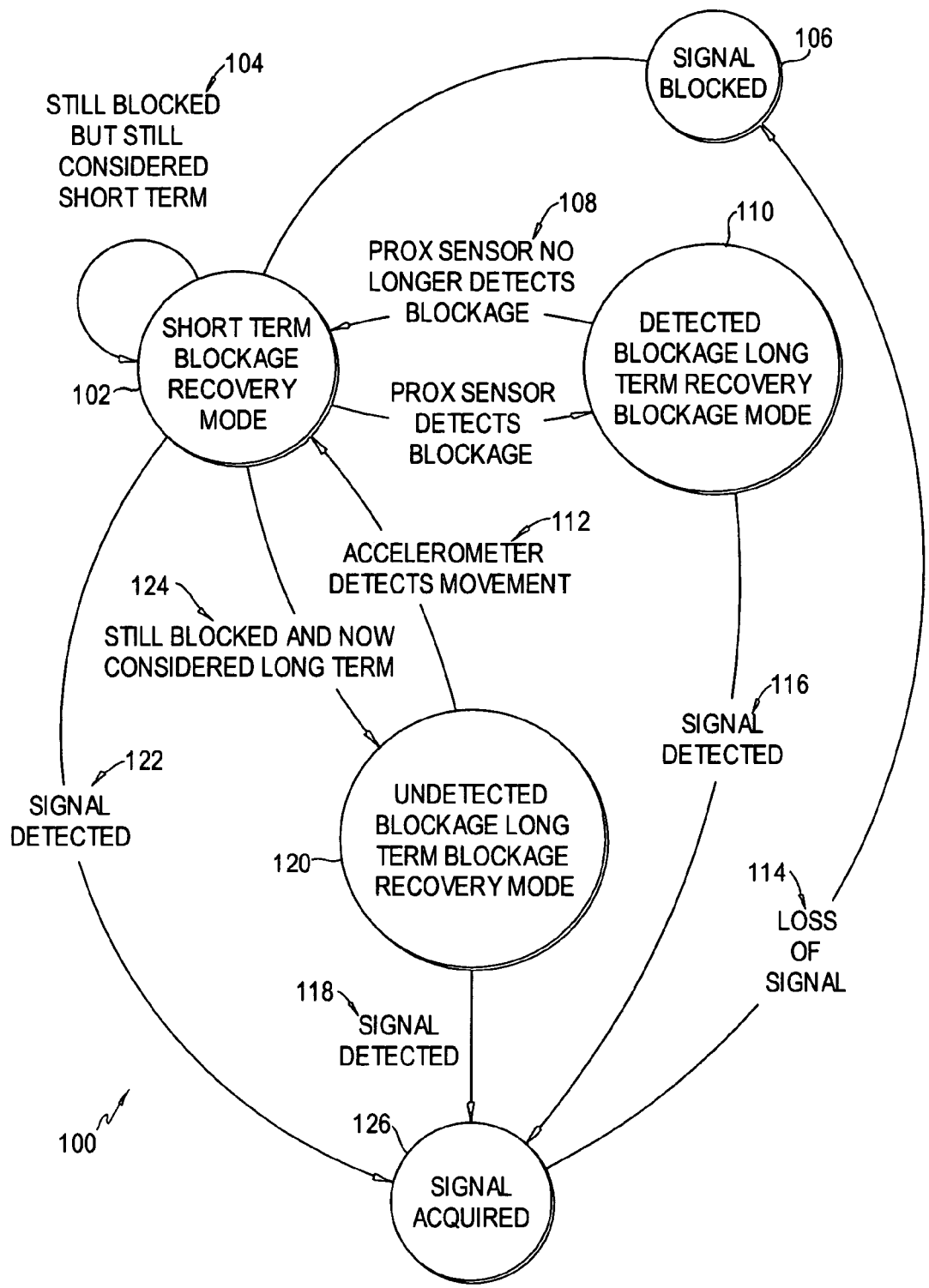
FIG. 1 is a state diagram of a preferred embodiment of the invention.

A preferred embodiment and two contexts in which it can be used will be disclosed in detail with reference to the drawings, in which like reference numerals refer to like elements throughout.

FIG. 1 depicts a preferred method 100 for predicting a recovery time to come out of long-term communications signal blockage for a communications signal. In the preferred method 100, one determines whether a signal is blocked 106. Assuming the signal blockage is short-term 102, it is then determined whether the signal is still blocked 104 but may be still considered a short-term blockage 102. Then, using an application-specific sensor that directly measures the presence of a blockage source, such as a proximity sensor 108, it can be determined whether the short-term blockage 102 may be considered as a detected long-term blockage 110. Should the source of blockage be removed, the transition is made from state 110 to 102 via 108. An accelerometer or ignition sensor may determine when the blockage is more likely to end to get out of an undetected blockage state 120.

Assuming that the source of long-term blockage is known, such as a container stacked above the mobile communications terminal thereby blocking the line-of-sight, the current state would be 110. At any time in state 110, should the signal be detected through periodic sampling, the transition is made to state 126 via 116. Assuming the short-term blockage 102 is still blocked and there is no direct source of blockage detected, the transition is made from 102 to 120 via 124.

At any time in state 120, should the signal be detected through periodic sampling, the transition is made to state 120 via 118. Should an accelerometer or ignition sensor or other sensor detect an increased probability that the mobile communications terminals' position will change (vehicle move) thereby potentially eliminating the source of blockage, the transition is made from state 120 back to 102 via 112. Finally, combining the information obtained from the application-specific sensors with the time spent in the blockage, one can optimize the monitoring of the communications channel to simultaneously minimize latency while conserving energy.

Figure 2:
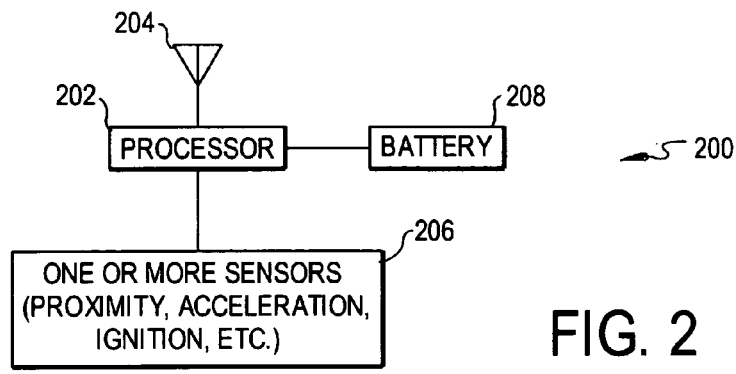
FIG. 2 is a block diagram of a communication device in which the preferred embodiment of the present invention is implemented.

The preferred embodiment could be physically realized as a communication terminal or other device with an integrated proximity sensor and/or integrated accelerometer and/or ignition sensor. An example is shown in FIG. 2. As shown in that figure, the communication device 200 includes a processor 202 that controls the operations of the device 200 and that in particular implements the process of FIG. 1. In communication with the processor 202 are an antenna 204, one or more sensors (proximity, acceleration, ignition, etc.) 206, and a power source such as a battery 208, as well as any other components which may be needed in any particular application.

Figure 3:
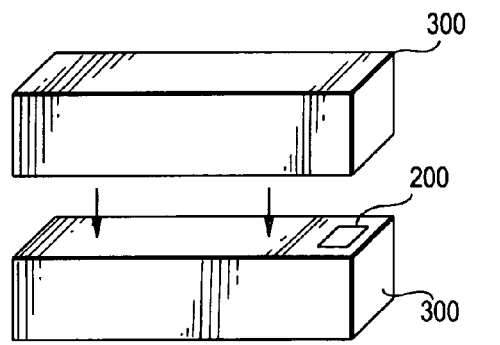
FIG. 3 shows a use of the preferred embodiment in the context of container shipping.

Examples of contexts in which the device 200 can be used will be described with reference to FIGS. 3 and 4. As shown in FIG. 3, when one container 300 is stacked on top of another container 300, a communication device 200 on top of the second container 300 experiences a blockage. Therefore, the communication device 200 might use a proximity sensor (not shown in FIG. 3, but corresponding to the one or more sensors 206 of FIG. 2) to detect the removal of a stacked container 300 and an accelerometer (not shown in FIG. 3, but corresponding to the one or more sensors 206 of FIG. 2) to detect when it is being moved which would predict when long-term blockage might end.

Figure 4:
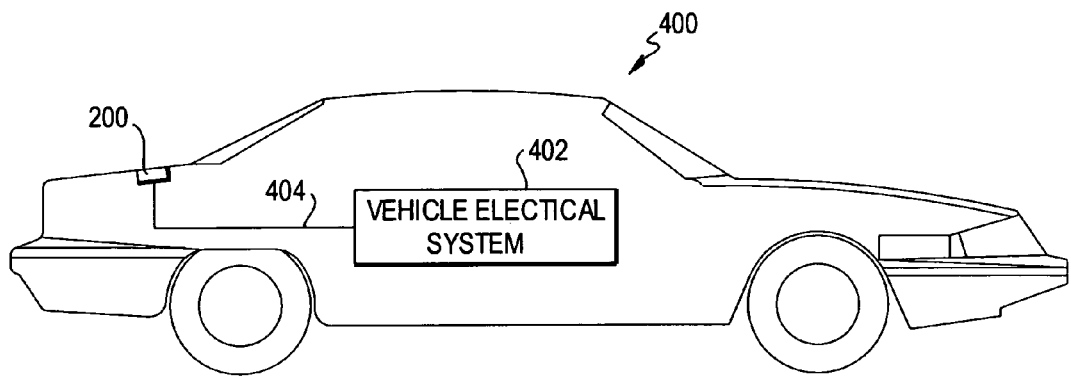
FIG. 4 shows a use of the preferred embodiment in a motor vehicle.

The preferred embodiment can be used in a motor vehicle in the manner shown in FIG. 4. In a vehicle 400, ignition sensing is readily achieved by connecting the communication device 200 to the vehicle's electrical system 402 via a cable harness 404. The sensor suite (not shown in FIG. 4, but corresponding to the one or more sensors 206 of FIG. 2) used would depend on the application and the anticipated types of blockage. For example, a vehicle tracking system that is already connected to the vehicle's electrical system could use ignition sensing capability to predict when long-term blockage, which is most likely when the vehicle is stationary, might end. An example of long-term blockage could occur when the vehicle 400 is parked in a parking garage; in that case, the long-term blockage is likely to end when the vehicle is started. In the vehicle context, the power source can be a battery, a connection to draw power from the vehicle's battery, or any other suitable power source.

It is very important to realize that when a short-term blockage state 102 has ended with a signal detection 122, this will be immediately recognized as an acquired signal 126. Hence, there is a minimal amount of time, and a minimal amount of power consumption when the present invention is used to determine and predict whether the communications signal has experienced a long-term blockage.

Sensor-based augmentation of blockage recovery can improve performance in applications with frequent long-term blockage. Monitoring the application-specific sensors consumes much less power than monitoring a communications channel as done in the prior art.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. A method for improving long-term blockage recovery of a communications signal, said method comprising the steps of:

monitoring a blockage source using at least one application-specific sensor, said at least one application-specific sensor comprising a proximity sensor;

ascertaining time spent in blockage; and predicting a likely blockage recovery interval from an output of the at least one application-specific sensor.

2. The method according to claim 1, further comprising combining information obtained from at least one application-specific sensor with the time spent in the blockage and predicting a likely blockage recovery interval.

3. The method according to claim 1, wherein the at least one application-specific sensor directly measures the source of the blockage.

4. The method according to claim 1, wherein the at least one application-specific sensor detects when static blockage conditions are likely to change.

5. The method according to claim 4, wherein the at least one application-specific sensor further comprises an accelerometer.

6. The method according to claim 4, wherein the at least one application-specific sensor further comprises a vehicle ignition sensor.

7. The method according to claim 1, further comprising the step of determining whether blockage is short-term or long-term.

8. The method according to claim 1, comprising the step of monitoring the blockage source using a plurality of application-specific sensors.

9. The method according to claim 8, wherein the plurality of application-specific sensors is a mixture of proximity sensors, ignition sensors and accelerometers.

10. A method for predicting a likely long-term communications signal blockage recovery interval, the method comprising the steps of:

determining whether a signal is blocked;

assuming that the signal blockage is short term, determining whether the signal is still blocked but may still be considered a short-term blockage;

sampling the communications signal at a higher rate;

using at least one application-specific sensor which comprises a proximity sensor, detecting whether the short-term blockage may be considered detected long-term blockage;

assuming detected long-term blockage, sampling the communications signal at a lower rate;

returning to a higher rate and periodic communications signal sampling once removal of the source of blockage has been detected;

assuming the short-term blockage is still present, determining whether the blockage may now be considered undetected long-term blockage;

assuming undetected long-term blockage, sampling the communications signal at a lower rate;

returning to a higher rate and periodic communications signal sampling upon detection by the at least one application-specific sensor that static blockage conditions are likely to change; and acquiring the detected signal from periodic sampling.

11. The method of claim 10, wherein the at least one application-specific sensor further comprises an accelerometer.

12. The method of claim 10, wherein the at least one application-specific sensor further comprises an ignition sensor.

13. A communication device for communicating over a signal and for recovering from a blockage in the signal, the communication device comprising:

an antenna for communicating over the signal;

at least one application-specific sensor, comprising a proximity sensor, for monitoring a source of the blockage in the signal;

a power source for the communication device; and a processor, in communication with the antenna, the at least one application-specific sensor, and the power source, for predicting a likely blockage recovery interval from an output of the at least one application-specific sensor.

14. The communication device according to claim 13, wherein the processor predicts the likely blockage recovery interval further in accordance with time spent in blockage.

15. The communication device according to claim 13, wherein the at least one application-specific sensor further comprises an acceleration sensor.

16. The communication device according to claim 13, wherein the at least one application-specific sensor further comprises an ignition sensor.

17. The communication device according to claim 16, wherein the ignition sensor comprises a connection to a vehicle electrical system.

18. The communication device according to claim 17, wherein the connection is over a cable harness.

* * * * *